United States Patent Office 3,108,138
Patented Oct. 22, 1963

3,108,138
PROCESS FOR THE PRODUCTION OF CARBO-DI-IMIDES
Matthias Seefelder, Ludwigshafen (Rhine)-Gartenstadt, and Gerald Neubauer, Ludwigshafen (Rhine), Germany, assignors to Badische Anilin- & Soda-Fabrik Aktiengesellschaft, Ludwigshafen (Rhine), Germany
No Drawing. Filed Nov. 28, 1960, Ser. No. 71,913
Claims priority, application Germany Sept. 14, 1960
3 Claims. (Cl. 260—551)

This invention relates to a new process for the production of carbo-di-imides.

Carbo-di-imides (i.e., compounds of the formula R—N=C=N—R in which each R denotes an aliphatic, cycloaliphatic, aromatic or araliphatic radical) have recently acquired increasing importance for various chemical reactions. For example the production of peptides from amino acids by means of carbo-di-imides has proved to be a great enrichment of protein chemistry. The carbo-di-imide binds the water formed in the reaction with the formation of the corresponding urea. Other compounds, as for example nucleoside phosphates and pyrophosphates or carboxylic acid esters, may however also be synthesized with the aid of carbo-di-imides in a very careful way and usually in excellent yields and purity.

Methods for the production of carbo-di-imides are known which are based on the reaction of thioureas with heavy metal oxides or with hypochlorites. Desulphurization of thioureas with metal oxides is a heterogeneous reaction which usually requires a long reaction period and always a large excess of a metal oxide which usually has to be specially prepared.

Since in the above-described applications the carbo-di-imides are converted into substituted ureas, it has been desirable to provide a method by which the ureas can be re-converted into carbo-di-imides by way of readily accessible intermediates rather than by the roundabout way of the thioureas.

The production of dicyclohexyl carbo-di-imide from dicyclohexylurea is described in U.S. Patent No. 2,797,240 in which dehydration to the carbo-di-imide is carried out with tosyl chloride in pyridine. The process is, however, limited to this one carbo-di-imide.

It is an object of the present invention to provide a simple process for the production of carbo-di-imides from compounds not hitherto used for this purpose. Another object of the invention is to provide a process for the production of the relatively unstable carbo-di-imides from relatively stable compounds, which requires a very short period of time. A further object of the invention is to provide a process for the production of carbo-di-imides which is simple to carry out.

We have found that carbo-di-imides of the general formula:

$$R_1—N=C=N—R_2$$

in which $R_1$ and $R_2$ each denotes an aliphatic, cycloaliphatic, aromatic or araliphatic radical can be prepared by splitting off hydrogen chloride from a chloroformic acid amidine hydrochloride of the general formual:

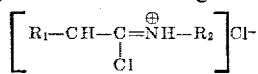

in which $R_1$ and $R_2$ have the meanings given above by treatment with water and/or acid-binding agents.

The course of the reaction may be reproduced as follows:

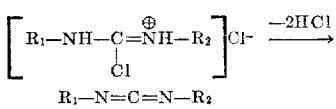

$R_1$ and $R_2$ having the meanings given above.

The chloroformic acid amidinium salts used as initial materials are obtained by the action of phosgene on the corresponding ureas or thioureas with the splitting off of carbon dioxide or carbon oxysulfide. The reactants are preferably used in stoichiometrical amounts or with a molar excess of phosgene at room temperature or slightly elevated temperature. Addition of a dialkylated carboxylic acid amide, for example N,N,-dimethylformamide or N-butylpyrrolidone, in many cases accelerates the splitting off of carbon dioxide or carbon oxysulfide.

The chloroformic acid amidinium chlorides used for the process have the general formula:

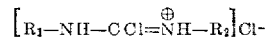

the substituents $R_1$ and $R_2$ being identical or different and standing for alkyl, cycloalkyl, aralkyl or aryl radicals. The alkyl radicals contain 1 to 20 carbon atoms. For later use as water-binding agents we prefer chloroformic acid amidinium chlorides containing alkyl groups with 1 to 8 carbon atoms. Chloroformic acid amidinium chlorides in which one or both alkyl substituents contain in α-position to nitrogen a secondary or tertiary carbon atom or in β-position a tertiary carbon atom are especially suitable. When the substituents $R_1$ and $R_2$ denote cycloalkyl radicals, the cycloalkyl rings in general contain 5 to 12 carbon atoms. Among the initial materials with araliphatic radicals, those with benzyl, α-phenylethyl or β-phenylethyl have special importance. When $R_1$ and/or $R_2$ stand for aryl radicals, the latter are usually mononuclear or dinuclear, i.e., they are derived from benzene or naphthalene.

The substituents $R_1$ and/or $R_2$ may in turn contain inert groups, as for example halogen, such as chlorine, bromine or iodine atoms, alkoxy groups of low molecular weight alcohols, phenoxy groups or nitro groups. When $R_1$ and $R_2$ stand for aryl radicals, these may be substituted in the aromatic nucleus by alkyl groups. The following are examples of compounds which may be used:
N,N'-dimethylchloroformic acid amidine hydrochloride,
N,N'-diethylchloroformic acid amidine hydrochloride,
N,N'-di-isopropylchloroformic acid amidine hydrochloride,
N,N'-di-n-butylchloroformic acid amidine hydrochloride,
N,N'-di-isobutylchloroformic acid amidine hydrochloride,
N-methyl-N'-ethylchloroformic acid amidine hydrochloride,
N-isopropyl-N'-butylchloroformic acid amidine hydrochloride,
N-isopropyl-N'-octylchloroformic acid amidine hydrochloride,
N-isobutyl-N'-octadecylchloroformic acid amidine hydrochloride,
N,N'-dioctylchloroformic acid amidine hydrochloride,
N,N'-dicyclopentylchloroformic acid amidine hydrochloride,
N,N'-di-cyclohexylchloroformic acid amidine hydrochloride,
N,N'-di-cyclo-octylchloroformic acid amidine hydrochloride,
N,N'-di-cyclododecylchloroformic acid amidine hydrochloride,
N-ethyl-N'-cyclohexylchloroformic acid amidine hydrochloride,
N'N'-diphenyl-chloroformic acid amidine hydrochloride,
N,N'-di-β-naphthylchloroformic acid amidine hydrochloride,
N,N'-di-para-tolylchloroformic acid amidine hydrochloride,
N-methyl-N'-phenylchloroformic acid amidine hydrochloride, N-methyl-N'-naphthyl-chloroformic acid amidine hydrochloride,
N-cyclohexyl-N'-phenylchloroformic acid amidine hydrochloride,
N-cyclo-octyl-N'-phenylchloroformic acid amidine hydrochloride,
N,N'-dibenzylchloroformic acid amidine hydrochloride,
N-benzyl-N'-phenylchloroformic acid amidine hydrochloride,
N-α-phenylethyl-N'-phenylchloroformic acid amidine hydrochloride,
N-β-phenylethyl-N'-phenylchloroformic acid amidine hydrochloride,
N-ethyl-N'-benzylchloroformic acid amidine hydrochloride,
N-allyl-N'-cyclohexylchloroformic acid amidine hydrochloride, and
N-crotyl-N'-phenylchloroformic acid amidine hydrochloride.

The substituents on the nitrogen may in turn contain inert groups, as for example halogen, alkoxy and nitro groups. For example the following compounds may be used:
N,N'-di-para-methoxyphenylchloroformic acid amidine hydrochloride,
N,N'-di-meta-chlorophenylchloroformic acid amidine hydrochloride,
N,N'-di-para-chlorophenylchloroformic acid amidine hydrochloride,
N-phenyl-N'-nitrophenylchloroformic acid amidine hydrochloride and
N-phenyl-N'-ethoxyethylchloroformic acid amidine hydrochloride.

The process for the production of carbo-di-imides from the corresponding chloroformic acid amidine hydrochlorides can be carried out by simply mixing the chloroformic acid amidine hydrochlorides with water. Splitting off of hydrogen chloride takes place and this is absorbed by the water. Since the carbo-di-imides formed are often unstable to aqueous acids, it is advisable to bind the acid by basic substances. As basic substances there may be used inorganic compounds, such as alkali or alkaline earth hydroxides, carbonates or bicarbonates, i.e., basic substances of the elements of groups IA and IIA of the periodic system, or organic substances, such as tertiary amines. For example lithium hydroxide, sodium hydroxide, potassium hydroxide, sodium carbonate, potassium carbonate, sodium bicarbonate, calcium hydroxide, barium hydroxide, magnesium hydroxide, calcium carbonate or magnesium carbonate may be used. Suitable tertiary amines include aliphatic, cycloaliphatic, araliphatic, aromatic-aliphatic tertiary amines, especially those having not more than one aromatic radical attached to nitrogen, all the radicals mentioned containing 1 to 12 carbon atoms. Other suitable organic bases are tertiary amines whose nitrogen atom is a member of a saturated or unsaturated heterocyclic ring. They include triethylamine, tributylamine, methylethylpropylamine, cyclohexyldiethylamine, benzyldiethylamine, dimethylaniline, dibutylaniline, N-ethylpyrrolidine, N-butylpentamethylene-imine, pyridine, quinoline, picoline, quinaldine and pyrimidine.

The relative proportions of substituted chloroformic acid amidine hydrochloride and of the agent for splitting off acid may vary within wide limits. They depend especially on the sensitivity of the carbo-di-imides formed. When the splitting off of hydrogen chloride is effected by means of water alone, it is advantageous to use such an amount of water that an acidity is set up at which the carbo-di-imide is not hydrated and hydrolyzed. When basic substances are added, it is advisable to add such an amount that the hydrochloric acid formed is neutralized. When the carbo-di-imide formed is not sensitive to alkali, an excess of alkali is not injurious.

The splitting off of hydrogen chloride from the chloroformic acid amidine hydrochlorides can also be carried out in the absence of water by means of basic substances alone. For example the chloroformic acid amidine hydrochlorides may be simply mixed with tertiary amines. In this case, however, working up is more difficult.

When the splitting off of the hydrogen chloride is carried out in the presence of water, the carbo-di-imides formed separate out primarily and can readily be separated. It is especially advantageous to carry out the splitting off of hydrogen chloride in a two-phase system consisting of an aqueous phase and a liquid organic phase which is immiscible or sparingly miscible with water. The inert organic phase takes up the carbo-di-imide formed. As the organic phase there are used solvents which are inert to water, as for example aliphatic, cycloaliphatic or aromatic hydrocarbons, preferably those with 5 to 16 carbon atoms, such as heptane, iso-octane, gasoline, cyclohexane, benzene, toluene or halogenated hydrocarbons, preferably those containing 1 to 10 carbon atoms, for example carbon tetrachloride, chloroform, methylene chloride, ethylene chloride, trichlorofluoro-methane, tetrachloroethane, chlorbenzene, trichlorobenzene, fluorobenzene, or open or cyclic ethers, for example diethyl ether, dibutyl ether, dimethyltetrahydrofurane, or ethylglycoldibutylether.

Since many carbo-di-imides are sensitive to alkalies, alkaline media must sometimes be avoided, that is, washing out must be effected solely with water, or the splitting off of hydrogen chloride must be carried out in a two-phase system so that the carbo-di-imide formed is immediately withdrawn from the alkaline medium.

The relative proportions of the aqueous phase and the substituted chloroformic acid amidine hydrochloride are not critical. Nor are those of the organic phase and the aqueous phase. For example 100 to 5000 grams of water may be used per mol of chloroformic acid amidine hydrochloride. The volumetric ratio of water and organic phase may lie for example between 10:1 and 1:10. When basic substances are coemployed, a solution of for example 2 to 25% strength may be used. These values for the relative proportions are however not to be regarded as limiting values.

The process may be carried out for example by introducing the chloroformic acid amidine hydrochloride into water and mixing, the carbo-di-imide separating in insoluble form. Too much heating is to be avoided if good yields are to be obtained. The temperature of the reaction mixture is preferably not allowed to rise above 60° C. When an acid-binding agent is used, the heat of neutralization must therefore be led away by cooling. If an immiscible organic solvent is coemployed, the chloroformic acid amidine hydrochloride is dissolved or suspended in this solvent and the solution or suspension slowly introduced, while thoroughly mixing, into water or into a solution of an alkaline substance. The carbo-di-imide formed is immediately taken up by the organic solvent and then no longer exposed to the influence of water or alkali when present. The reaction proceeds very rapidly. The organic phase is separated, dried and then distilled or, if the residue is a solid, recrystallized.

It is also possible to mix the base, especially when an organic base is used, with the organic solvent, to add the chloroformic acid amidine hydrochloride and then to wash this mixture with water.

A special advantage of the process according to the present invention as compared with the known methods for the production of carbo-di-imides resides in the fact that the relatively unstable carbo-di-imides can be prepared in a very short time from the readily accessible and relatively stable chloroformic acid amidine hydrochlorides. For example, by simple titration with dilute caustic soda solution, an accurately predetermined amount of carbo-di-imide can be prepared and, after simple separation, used without further purification for further reactions, above all for splitting off water.

The invention is further illustrated by the following examples but it is not limited thereby. The parts unless otherwise specified, are parts by weight. The parts by volume bear the same relation to the parts by weight as the cubic centimeter to the gram under standard conditions.

*Example 1*

180 parts of N,N'-dicyclohexylurea are introduced within 15 minutes at 20° to 25° C. while stirring into a solution of 100 parts of phosgene in 500 parts of tetrahydrofurane. A clear solution is formed with vigorous evolution of carbon dioxide. After about 60 minutes, the N,N'-dicyclohexylchloroformic acid amidine hydrochloride begins to crystallize. As soon as crystallization is ended, the crystals are filtered off. 170 parts of N,N'-dicyclohexylchloroformic acid amidine hydrochloride (melting point 135° to 138° C.) are obtained.

A solution of 558 parts of N,N'-dicyclohexylchloroformic acid amidine hydrochloride in 1900 parts by volume of chloroform is slowly added to 1100 parts by volume of 20% aqeuous caustic potash solution at 0° C. while stirring. When all has been added, the aqeuous phase is separated and washed twice with a little chloroform. The chloroform solutions are united, washed with water, dried with potash and distilled. 351 parts of N,N'-dicyclohexylcarbo-di-imide of the boiling point 158° to 160° C. at 12 mm. Hg are obtained; this is a yield of 84.5% of the theory.

*Example 2*

A solution of 25 parts of N,N'-dicyclohexylchloroformic acid amidine hydrochloride (prepared as described in Example 1) in 150 parts by volume of chloroform is added within a short time while stirring to 18.2 parts of triethylamine at 0° C. and stirred for some time. It is then repeatedly washed with ice-water until chlorine ions can no longer be detected in the filtrate. The product is worked up as described in Example 1. The yield is 8 parts of N,N'-dicyclohexylcarbo-di-imide of the boiling point 158° to 160° C. at 12 mm. Hg, or 43.2% of the theory.

*Example 3*

A solution of 62 parts of phosgene in 200 parts of benzene is allowed to flow at once into a suspension of 80 parts of N,N'-isopropyl-thiourea in 160 parts of benzene. The temperature rises to 35° C. with vigorous evolution of gas. The mixture is stirred for 2 hours, 1 part of dimethylformamide then added and the temperature raised to 40° C. until evolution of gas has ended. The benzene is distilled off in vacuo from the clear solution. The residue (114 parts) solidifies to form crystals which as an impure compound melt in the range of 89° to 103° C. After recrystallization from ether, chloroformic acid N,N'-di-isopropylamidine hydrochloride of the melting point 100° to 105° C. is obtained.

A solution of 29.9 parts of N,N'-di-isopropylchloroformic acid amidine hydrochloride in 200 parts of chloroform is added at 0° C. while stirring to a solution of 22.4 parts of potassium hydroxide in 800 parts of water and further stirred for a short time. The product is worked up as described in Example 1. The yield is 14 parts of N,N'-di-isopropylcarbo-di-imide (74% of the theory) of the boiling point 45° C. at 16 mm. Hg.

*Example 4*

N-phenyl-N'-cyclohexylchloroformic acid amidine hydrochloride (melting point 148° to 150° C.) is prepared from N-phenyl-N'-cyclohexylurea and phosgene in a way analogous to that described in Example 1 for the production of N,N'-dicyclohexylchloroformic acid amidine hydrochloride.

A solution of 19 parts of N-phenyl-N'-cyclohexylchloroformic acid amidine hydrochloride in 160 parts of chloroform is added at 0° C. while stirring to 120 parts by volume of a 5% aqueous caustic soda solution. By working up analogously to Example 1, 11 parts (78.5% of the theory) for phenylcyclohexylcarbo-di-imide of the boiling point 110° to 115° C. at 0.3 to 0.4 mm. Hg are obtained.

*Example 5*

A solution of 20 parts of N-phenyl-N'-benzylchloroformic acid amidine hydrochloride (melting point 141° to 144° C., prepared from N-phenyl-N'-benzylthiourea and phosgene in benzene at 20° to 30° C.) in 200 parts by volume of chloroform is added at 0° C. while stirring to 70 parts by volume of a 10% aqueous caustic potash solution and then further stirred for 5 minutes. By working up in a manner analogous to that described in Example 1, 10.2 parts (70.3% of the theory) of phenylbenzylcarbo-di-imide of the boiling point 125° to 150° C. at 0.3 to 0.7 mm. Hg are obtained.

*Example 6*

A solution of 40 parts of N,N'-diphenylchloroformic acid amidine hydrochloride (melting point 123° to 125° C., prepared from N,N'-diphenylthiourea and phosgene in benzene at 20° C.) in 350 parts by volume of chloroform is added at 0° C. while stirring to 70 parts by volume of a 20% aqueous caustic potash solution. Then 100 parts by volume of ice-water are added and the whole stirred for a short time. After working up as described in Example 1, 22 parts (75.6% of the theory) of diphenylcarbo-di-imide of the boiling point 185° to 188° C. at 18 mm. Hg are obtained.

*Example 7*

A solution of 32.7 parts of N,N'-di-(para-methoxyphenyl)-chloroformic acid amidine hydrochloride (melting point 116° to 118° C., prepared from N,N'-di-para-methoxyphenylurea and phosgene in the temperature range of 15° to 30° C.) in 200 parts by volume of chloroform is added at 0° C. while stirring to a solution of 40 parts of potassium hydrogen carbonate in 100 parts of water. By working up in the manner described in Example 1, 17 parts (66.9% of theory) of di-para-methoxyphenylcarbo-di-imide of the boiling point 174° to 176° C. at 0.2 mm. Hg are obtained.

*Example 8*

26 parts of N,N'-di-(para-methoxy-phenyl)-chloroformic acid amidine hydrochloride, dissolved in 150 parts by volume of chloroform, are rapidly added while stirring to 250 parts by volume of ice-water; then the chloroform layer is separated and washed six times, each time with 250 parts of ice-water. By working up as described in Example 1, 8 parts (63% of the theory) of di-para-methoxyphenylcarbo-di-imide of the boiling point 170° to 172° C. at 0.1 mm. Hg are obtained.

*Example 9*

15 parts of chloroformic acid N,N'-di-(meta-chlorphenyl)-amidine hydrochloride (melting point 108° to 109° C., prepared from N,N'-di-meta-chlorphenylthiourea and phosgene in benzene at room temperature in the presence of 5% of dimethylformamide) are dissolved in 700 parts by volume of chloroform and poured into about 1000 parts of ice-water. After separating the chloroform layer, the aqueous layer is extracted with a little chloroform. The two chloroform solutions are united and washed several times with a total of 1500 parts of ice-water until the filtrate has a neutral reaction. The chloroform solution is dried over potash, filtered and the chloroform evaporated off. 11 parts (93.5% of the theory) of di-meta-chlorphenylcarbo-di-imide of the melting point 110° to 111° C. (Cl: found 26.6%; calculated 27.0%) remain as residue.

*Example 10*

220 parts of chloroformic acid N,N'-di-isobutylamidine hydrochloride (melting point 60° to 63° C., prepared from N,N'-di-isobutylthiourea and phosgene in benzene at room temperature in the presence of 5% of dimethylformamide) are dissolved in 400 parts of chloroform and introduced at 0° to 5° C. into 600 parts of 20% caustic soda solution. The mixture is then stirred for another 10 minutes, separated in a separating funnel and the aqueous layer shaken up again with chloroform. From the united organic fractions, the chloroform is distilled off. The residue is distilled. 63 parts (43% of the theory) of N,N'-di-isbutylcarbo-di-imide of the boiling point 71° to 73° C. at 11 mm. Hg are obtained.

*Example 11*

47 parts of N,N'-dicyclohexyl-chloroformic acid amidine hydrochloride are introduced in the course of 1 hour at 15° C. into 101 parts of 20% caustic soda solution. The mixture is stirred for another half an hour, separated in a separating funnel, the organic layer freed from solid constituents by filtration and the filtrate distilled under reduced pressure. 18 parts of N,N'-di-cyclohexylcarbo-di-imide of the boiling point 113° to 114° C. at 0.3 mm. Hg are obtained.

*Example 12*

47 parts of N,N'-dicyclohexylchloroformic acid amidine hydrochloride are introduced in the course of 5 minutes at 10° C. while stirring vigorously into a mixture of 101 parts of 20% caustic soda solution and 120 parts of ether. The mixture is stirred for another 20 minutes and after being filtered the ether layer is separated from the water layer. The separated organic layer yields by distillation 20 parts of N,N'-dicyclohexylcarbo-di-imide of the boiling point 116° to 117° C. at 0.6 mm. Hg are obtained.

*Example 13*

A suspension of 134 parts of N,N'-diphenylchloroformic acid amidine hydrochloride in 500 parts of chloroform is allowed to flow within 15 minutes at 30° C. while stirring into 303 parts of 20% caustic soda solution. The mixture is stirred for another 5 minutes, separated in a separating funnel and the chloroform layer distilled in vacuo after it has been dried and the solvent has been distilled off. 82 parts of N,N'-diphenylcarbo-di-imide are obtained.

*Example 14*

A suspension of 42 parts of N,N'-diphenylchloroformic acid amidine hydrochloride in 300 parts of chloroform is introduced at 10° C. within 10 minutes into a vigorously stirred suspension of 25 parts of precipitated calcium carbonate in 250 parts of water. After all has been added, stirring is continued for another ten minutes, after which evolution of carbon dioxide can no longer be observed. The mixture is worked up as described in Example 13. 25 parts of N,N'-diphenyl-carbo-di-imide are obtained.

*Example 15*

A suspension of 117 parts of N-phenyl-N'-isopropylchloroformic acid amidine hydrochloride (melting point 149° to 150° C., prepared from N-phenyl-N'-isopropylthiourea and phosgene in benzene at room temperature in the presence of 5% of dimethylformamide) in 200 parts of chloroform is introduced at 10° to 12° C. in the course of 15 minutes into 303 parts of 20% caustic soda solution. The mixture is stirred for another 5 minutes, separated in a separating funnel and the aqueous layer extracted three times with chloroform. After distilling off the chloroform from the combined extracts, the residue is distilled under reduced pressure. 73 parts of N-phenyl-N'-isopropylcarbo-di-imide of the boiling point 69° C. at 0.2 mm. Hg are obtained. The yield is 91% of the theory.

*Example 16*

115 parts of N,N'-di-para-tolylchloroformic acid amidine hydrochloride (obtained from N,N'-di-para-tolylthiourea and phosgene; decomposes at 124° to 126° C.) are dissolved in 500 parts of methylene chloride and introduced within 15 minutes into 250 parts of 20% sodium hydroxide solution at 4 to 6° C. The mixture is stirred for another 5 minutes and then separated in a separating funnel. The methylene chloride layer is evaporated after a short drying over potash. 74 parts of N,N'-di-paratolylcarbo-di-imide remain as a crystalline residue with the melting point 51° to 54° C. The compound can be purified by distillation or recrystallization.

*Example 17*

65 parts of N,N'-di-β-naphthylchloroformic acid amidine hydrochloride (obtained from N,N'-di-β-naphthylthiourea and phosgene; decomposes slowly above 170° C.) are dissolved in 500 parts of tetrachlorethane and dripped within 20 minutes at 4° to 6° C. into 125 parts of 20% sodium hydroxide solution. The mixture is stirred for another 5 minutes, then separated and the tetrachlorethane layer evaporated. 46 parts of crude N,N'-di-β-naphthylcarbo-di-imide are obtained as a crystalline residue with the melting point 135° to 141° C. After recrytsallization from benzene, the compound melts at 141° to 144° C.

We claim:

1. A process for the production of carbo-di-imides of the formula $R_1-N=C=N-R_2$ in which each $R_1$ and $R_2$ stands for a member selected from the group consisting of an alkyl group with 1 to 20 carbon atoms, a cycloalkyl group with 5 to 12 ring carbon atoms, benzyl, phenyl ethyl, phenyl, tolyl, naphthyl and one of the aforesaid members substituted by a substituent selected from the group consisting of chloro, bromo, iodo, methoxy, ethoxy, phenoxy and nitro which process comprises splitting out at a temperature not exceeding 60° C. hydrogen chloride from a substituted chloroformic acid amidine hydrochloride of the formula

in which $R_1$ and $R_2$ have the meanings given above by mixing with a member selected from the group consisting of water, mixtures of water and inorganic basic compounds of metals of groups IA and IIA, of the periodic system, tertiary amines with 1 to 12 carbon atoms in each group and mixtures of these compounds with the provision that in the case of using water alone the water is used in an amount of 100 g. to 5000 g. per mole of chloroformic acid amidine hydrochloride; and separating the carbo-di-imide formed.

2. A process for the production of carbo-di-imides of the formula $$R_1-N=C=N-R_2$$

in which each of $R_1$ and $R_2$ stands for a member selected from the group consisting of an alkyl group of from 1 to 20 carbon atoms, a cycloalkyl group with 5 to 12 carbon atoms in the ring, benzyl, phenyl ethyl, phenyl, tolyl, naphthyl and one of the aforesaid members substituted by a substituent selected from the group consisting of chloro, bromo, iodo, methoxy, ethoxy, phenoxy and nitro, which process comprises spliting out at a temperature not exceeding 60° C. hydrochloride from a substituted chloroformic acid amidine hydrochloride of the formula

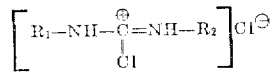

in which $R_1$ and $R_2$ have the meanings given above by mixing the said chloroformic acid amidine hydrochloride with an intermingled two phase liquid medium consisting of an aqueous phase and an inert, substantially water-immiscible, organic solvent, which is a solvent for said carbo-di-imide, the volumetric ratio of said aqueous phase to said organic solvent being in the range of 10:1 to 1:10, said organic phase dissolving said carbo-di-imide and recovering the said carbo-di-imide from the formed solution.

3. A process for the production of carbo-di-imides of the formula $$R_1-N=C=N-R_2$$

in which each of $R_1$ and $R_2$ stands for a member selected from the group consisting of an alkyl group of from 1 to 20 carbon atoms, a cycloalkyl group with 5 to 12 carbon atoms in the ring, benzyl, phenyl ethyl, phenyl, tolyl, naphthyl and one of the aforesaid members substituted by a substituent selected from the group consisting of chloro, bromo, iodo, methoxy, ethoxy, phenoxy and nitro, which process comprises splitting out at a temperature not exceeding 60° C. hydrochloride from a substituted chloroformic acid amidine hydrochloride of the formula

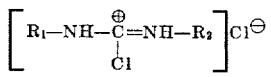

in which $R_1$ and $R_2$ have the meanings given above by mixing the said chloroformic acid amidine hydrochloride with an intermingled two phase liquid medium consisting of an aqueous phase and an inert, substantially water-immiscible organic solvent, which is a solvent for said carbo-di-imide, the volumetric ratio of said aqueous phase to said organic solvent being in the range of 10:1 to 1:10, said aqueous phase containing a basic compound selected from the group consisting of alkaline inorganic compounds of elements of groups IA and IIA of the periodic system and tertiary amines with up to 12 carbon atoms in each group.

References Cited in the file of this patent

UNITED STATES PATENTS 2,845,458     Lecher et al. _____ July 29, 1959

OTHER REFERENCES

Johnson et al.: J. American Chem. Soc., volume 61, pages 176–178 (1939).

UNITED STATES PATENT OFFICE
CERTIFICATE OF CORRECTION

Patent No. 3,108,138            October 22, 1963

Matthias Seefelder et al.

It is hereby certified that error appears in the above numbered patent requiring correction and that the said Letters Patent should read as corrected below.

Column 1, line 60 to 62, for that portion of the formula reading:

—CH—    read    —NH— column 2, line 66, for "N'N'" read -- N,N' --; column 7, line 69, for "isopropylcarbo--di-imide" read -- isopropylcarbo-di-imide --; column 10, line 14, for "1959" read -- 1958 --.

Signed and sealed this 12th day of May 1964.

(SEAL)
Attest:
ERNEST W. SWIDER

EDWARD J. BRENNER
                                              Commissioner of Patents Attesting Officer